United States Patent Office 3,189,512
Patented June 15, 1965

3,189,512
CERAMIC CEMENTS, LAMINATES AND METHODS
Guy E. Stong, Elmira, N.Y., assignor to Corning Glass Works, Corning, N.Y., a corporation of New York
No Drawing. Filed Jan. 8, 1962, Ser. No. 164,993
11 Claims. (Cl. 161—192)

This invention relates to the joining of two ceramic bodies of the same or dissimilar nature over a considerable area, the bodies being characterized by a low thermal expansion and in particular, the invention relates to new cements particularly suited to joining low thermal expansion ceramic bodies that can be of dissimilar nature.

Attempts to attach a solid, circular ceramic rim to the periphery of a ceramic honeycomb body without the use of a cement almost invariably have failed due to the firing shrinkage that causes cracking of the ceramic rim or because the fragile boundaries of the honeycomb adjacent the rim would break. In attempts to join such bodies with known ceramic cements, it is difficult to fill the narrow spaces between the bodies and it is a practical impossibility to keep such spaces filled after compaction or fusion of the cement at elevated temperatures. Moreover, it has been found that bonds of such known cements frequently are discontinuous.

It is therefore a primary object of the present invention to provide novel ceramic cements particularly useful for joining low thermal expansion ceramic bodies.

Another object of the invention is to provide a novel ceramic cement for joining low thermal expansion bodies by which gaps between the bodies are readily filled and a firm bond results.

Another object of the invention is to provide cements whereby structurally sound bonds between low thermal expansion ceramic bodies can be produced, which bonds remain structurally sound under elevated temperature applications.

These and other objects are attained in accordance with the present invention in which low thermal expansion ceramic bodies are structurally joined to one another by novel low thermal expansion cements that are applied and then set in place by a conventional heating schedule. In this general manner, a structurally sound article is produced having a ceramic bond between the joined articles, that remains structurally sound in elevated temperature applications.

The low thermal expansion cements of this invention comprise a powdered mixture containing about 1 to 16 percent of lead oxide, about 1 to 15 percent of fluoride and oxide fluxes, at least one member selected from the group consisting of 1 to 6 percent of silicon carbide and 1 to 6 percent of sulfur trioxide, and the remainder substantially all a lithium aluminosilicate ceramic material. The lithium aluminosilicate ceramic material is ordinarily at least 70 weight percent of the total composition. In combination with the other materials it readily cements or joins the ceramic substrates with a bond that in the fired state, and whether foamed or unfoamed, has a low coefficient of thermal expansion. Representative ceramic materials that are suitable include glassy and crystalline lithium aluminosilicates such as vitrified or devitrified petalite, derived from either natural or synthetic petalite, glass ceramics having a lithium aluminosilicate base such, for example, as that disclosed in Example 1 of Stookey, United States Patent Number 2,920,971, and combinations of the foregoing. The lithium aluminosilicate ceramic material is used in a finely ground condition, i.e., minus 200 mesh (Tyler) or finer.

The silicon carbide and the sulfur trioxide together cause foaming and preferably are used in substantially equal amounts of about 2 to 4 percent each when foaming is desired. As is ordinary in the glass and ceramic arts, the sulfur trioxide content of the batch is provided by a sulfate, and such sulfates as calcium sulfate, barium sulfate, strontium sulfate, magnesium sulfate, zinc sulfate, cadmium sulfate, lead sulfate, lithium sulfate, sodium sulfate and potassium sulfate can be used for this purpose. In addition to the sulfur trioxide content, these sulfates also provide the corresponding oxide that in the instance of lead sulfate, contributes to the necessary lead oxide content and in the other instances contributes an oxide flux.

Typical fluxes that can be used include lead fluoride, zinc fluoride, barium fluoride, calcium fluoride, magnesium fluoride, strontium fluoride, lithium fluoride, sodium fluoride, potassium fluoride, and cadmium fluoride. Mixtures of flux materials, for example calcium fluoride and zinc fluoride, can also be used to assist in obtaining the desired fluxing action and a minimum effect on the coefficient of expansion and on devitrification of the bodies to be joined. Similarly, the corresponding oxides can be used at least in part for the fluoride fluxes just mentioned. For example, combination fluxes of zinc oxide, magnesium fluoride and calcium fluoride, of zinc oxide, magnesium oxide, magnesium fluoride and calcium fluoride, and of zinc oxide and calcium fluoride have been used in producing useful cements. It has also been found useful to calcine fluoride fluxes lightly prior to use, to eliminate unneeded volatiles and moisture; generally, part of the fluoride converts to the oxide form during calcination. Barium and calcium fluorides have a pronounced effect in increasing the expansion coefficient, and can be used in amounts calculated to produce the desired level of that property.

Within the foregoing broad range of compositions are intermediate ranges that are preferred because of intended applications, a particular property or the like. For example, it is preferred that one of the mentioned fluoride fluxes be present in an amount of about 0.5 to 10 percent and that there be present at least one other flux also in an amount of 0.5 to 10 percent and selected from the group consisting of fluorides and oxides of zinc, barium, calcium, magnesium, strontium, lithium, sodium, potassium, and cadmium, with the total amount of the flux being not greater than 15 percent. An overall general preferred composition contains about 4 to 10 percent of lead oxide, 2 to 4 percent of silicon carbide, 2 to 4 percent of sulfur trioxide, 1 to 3.5 percent of calcium fluoride, 1 to 10 percent of zinc oxide, up to 6 percent of zinc fluoride, up to 3 percent of magnesium oxide, up to 6 percent of magnesium fluoride, with the total of calcium fluoride, zinc oxide, zinc fluoride, magnesium oxide and magnesium fluoride being in the range of about 8 to 13 percent, and the remainder glass petalite. This range of compositions defines foaming cements and the same composition omitting either, but not both, of the silicon carbide or sulfur trioxide is the preferred non-foaming cement composition.

In preparing cements in accordance with this invention, the order of addition has not been found to be of controlling significance. Mixing should be practiced sufficiently to obtain uniformity of the composition. The particle size of the components usually is at least minus 200 mesh (Tyler) and preferably minus 325 mesh down to an impalpable fineness as is customary in cement formulations. Thorough mixing and fine particle size contribute to the foaming during the production of the bond. The components can be dry mixed, or wet mixed, or both. Wet mixing has been found suitable since the ceramic members being joined are usually porous and liquids in the cement can escape through those members. Any liquid can be used that does not deleteriously affect the character of the components; water and such organic liquids as butyl alcohol, toluene or the like as well as mixtures of them are satisfactory.

In applying the cements, the ceramic bodies to be joined are placed in position relative to one another as desired in the finished article. The cement, suitably dispersed in an inert liquid, is then poured into the spaces at the plate of joinder. Simple pouring usually is adequate. The manner of application of cement is generally indicated by the nature of the joint to be produced and it is well within the skill of the artisan in the ceramic arts to tamp or compact the cement if the problem requires.

The cement compositions of this invention are used to join ceramic articles to one another by heating the cements in place at a temperature of about 1050° to 1150° C., whereupon the cements sinter to the ceramic parts. After firing, the assembly is cooled to handling temperature. Where a foaming cement is used (i.e. with cements including both the silicon carbide and sulfur trioxide), foaming will also occur in this temperature range. With either cement, the firing temperature is maintained generally for about ½ to 3 or more hours. With cements applied with an organic dispersion agent, it frequently is desirable to drive off that material as by first heating the assembly at a temperature of about 100° to 200° C.

Other suitable firing procedures will be apparent to those skilled in the art. However, for petalite base cements, a particularly satisfactory firing schedule involves driving off any dispersion agent present at a temperature of 100° to 200° C. and thereafter heating at a rate of at least 5° C./minute (300° C./hour) until the temperature range of 1050° to 1150° C. is reached. After the firing action, and foaming if the foaming cement is used, is completed, the assembly is cooled at the controlled rate of not greater than 5° C./minute and preferably not greater than about 100° C./hour. It has been found that these heating and cooling rates are effective in producing exceptionally sound and complete bonds with petalite base cements.

The cements, foaming as well as non-foaming, are characterized by a low coefficient of thermal expansion, for example on the order of about minus 10 to plus $20 \times 10^{-7}/°$ C. from room temperature to 300° C. Any ceramic body not materially mismatched with that expansion coefficient can be joined to another with these cements. As is apparent to the artisan, material mismatch will result in internal stresses that can limit the useful life of the resulting article. Typical materials used in preparing ceramic shapes of this character include the well known glass-ceramics, especially those made in accordance with Examples 1 to 8 of United States Patent Number 2,920,971, petalite, mixtures of petalite and glass-ceramics and the like. Other glass articles that can be joined with cements of the invention are made in accordance with the teachings in United States Patent Number 2,106,744.

The manner of forming suitable articles from such ceramics, which constitutes no part of the present invention, is well within the abilities of those skilled in the ceramic arts. Preferably, however, articles are slip cast or are formed in accordance with the general process disclosed in the copending application of Hollenbach, Serial Number 759,706, filed September 8, 1959, and now U.S. Patent 3,112,184. In that process, a mixture of pulverized ceramic and a binder is used to coat a flexible carrier. The resulting coated carrier is crimped and then is formed to the desired shape by, for example, winding it to a cylindrical shape alone or with a similarly coated but uncrimped carrier, or stacks of crimped and uncrimped carriers can be produced. However shaped, the unit is then fired to sinter the ceramic particles to a unitary structure.

The invention will be described further in conjunction with the following examples in which the details are given by way of illustration and are not to be construed as limiting.

A glass is prepared by fusing petalite and lead sulfate ($PbSO_4$), the latter providing a lead oxide ($PbO$) content of 8 weight percent and 2.87 weight percent of $SO_3$. A cement in accordance with this invention is then made by providing a batch of finely ground materials as follows:

800 grams of the glass
40 grams of $ZnF_2$
48 grams of $MgF_2$
24 grams of $CaF_2$
32 grams of SiC The zinc fluoride is first calcined at 700° C. and has an analysis of 58 percent $ZnF_2$ and 42 percent ZnO. This batch is dispersed in a mixture containing 75 weight percent of butyl alcohol and 25 weight percent of toluene, and is wet ball milled for one hour to thoroughly mix the batch. The parts to be joined by this cement are a ceramic rim and matrix for a rotating regenerative heat exchanger that fit with a clearance of ⅛ inch. These parts are aligned, and the thoroughly mixed batch of cement is run into the annulus at the line of joinder. The rim and matrix of ceramic material are porous. Accordingly, the ceramic dispersing liquids are rapidly absorbed so that the cement is firm shortly after it is placed. This assembly is then placed in a furnace and raised to 100° C. at a rate of 2° C./minute. After 2 hours at 100° C., the temperature is raised at 5° C./minute to 1100° C. After being held at 1100° C. for one hour and 15 minutes, it is furnace cooled at a rate of 5° C./minute to handling temperature.

In actual practice of the invention, ceramic assemblies having an outside diameter of 23 inches were made and very satisfactory foamed bonds were formed at all points of contact of the rim and matrix. In one run, nine rim, hub and matrix assemblies were made with the same firing schedule. The matrix was a honeycomb body made by the Hollenbach process identified hereinbefore in which the ceramic particles were a mixture, by weight, of 75 percent petalite and 25 percent of glass ceramic having an oxide analysis, in weight, as follows: 70 percent $SiO_2$, 18 percent $Al_2O_3$, 5 percent $TiO_2$, 3 percent $Li_2O$, 3 percent MgO and 1 percent ZnO. The rims were made by heat sagging strips of borosilicate glass, disclosed in Hood et al. United States Patent 2,106,744, into arcuate sections. The heat sagged sections were arranged to form a cylindrical rim and the abutting ends were heat sealed. The hubs were slip cast from powdered borosilicate glass of Hood et al. The rim, hub, and matrix assemblies were joined with the cement and procedure in the example just given. Five of these assemblies were field tested in a gass turbine and one ran over 50 hours without damage.

Other typical foaming cements that have been prepared and which are considered to be particularly useful in that adequate foaming is regularly achieved and which do not appear to contribute to devitrification of the ceramic articles being joined have compositions, by weight, as follows: 9.23 percent of zinc fluoride, 1.28 percent of calcium fluoride, 3.42 percent of silicon carbide and the remainder petalite that had been fused with lead sulfate in an amount such that it contained 8 percent of lead oxide and 2.87 percent of $SO_3$. Over the temperature range of 25 to 300° C., the cement, after foaming, had an average expansion coefficient of minus $5.3 \times 10^{-7}/°C$. Over the broader range of 25° to 450° C., the coefficient was minus $1.0 \times 10^{-7}/°C$. while from 25° to 650° C. it was plus $2.0 \times 10^{-7}/°C$. Another cement contained 3.75 percent of zinc oxide, 5.00 percent of magnesium fluoride, 2.55 percent of calcium fluoride, 3.41 percent of silicon carbide and the remainder the lead sulfate-petalite fusion mixture as given hereinbefore. This cement, after foaming, had an average coefficient of expansion of plus $0.2 \times 10^{-7}$/°C. over the range of 25° to 300° C.

Many cements were made in which the glass contained small amounts of various additives. For example, in one instance the glass (A) was formed, on a weight basis, from about 1 percent of litharge, 4 percent of boric anhydride and the remainder petalite. Another (B) contained 8 percent of litharge, about 1.5 percent of lithium fluoride and the remainder petalite. Another (C) was made from 10 percent fumed white lead and the balance petalite. Still another (D) was made from about 8 percent of fumed white lead, about 8 percent of zinc oxide, about 1.5 percent of fluorspar and the remainder petalite. A good foaming cement was made with glass A by using 3.45 percent of lithium sulfate, 6.9 percent of lithium fluoride and 3.45 percent of silicon carbide. By using 7.0 percent of barium sulfate, 1.75 percent of sodium fluoride and 3.5 percent of silicon carbide with glass B, a good foam was achieved at 1100° C. With various additions of magnesium fluoride, calcium fluoride and silicon carbide to glasses C and D good foaming was achieved at temperatures of 1050° to 1150° C. Other cements will be suggested to the artisan from these examples.

In the foregoing examples, the cements contain both the sulfate component, and thus sulfur trioxide, and the silicon carbide and therefore are foaming cements. The exact same cements can be made non-foaming by eliminating either the sulfate or the silicon carbide, and preferably the latter. These non-foaming cements have essentially the same properties as the corresponding foaming cements and therefore are characterized by low to zero coefficient of thermal expansion and can be readily fired to produce sound bonds at a temperature of about 1050° C. or higher. By way of example, shapes of honeycomb material made of a mixture of glass ceramics and petalite have been successfully joined with non-foaming cements having a compoistion of 1.84 percent of zinc oxide, 2.54 percent of zinc fluoride, 7.02 percent of lead oxide, 2.52 percent of sulfur trioxide, 5.26 percent of magnesium fluoride, 2.63 percent of calcium fluoride, and 78.18 percent of petalite. The petalite, lead oxide and sulfur trioxide were provided by fusing fumed white lead and petalite. This cement readily joins such honeycomb bodies upon heating the cement in place at a temperature of about 1150° C. The average expansion coefficient over the temperature range of 25° to 300° C. for this cement is minus $3.8 \times 10^{-7}$/° C.

From the foregoing discussion and description, it will be apparent that the present invention provides unique cements, both foaming and non-foaming, that can be used in joining ceramic articles to one another in which the ceramic articles are characterized by a low to zero coefficient of thermal expansion and in which good, sound bonds that can withstand substantial thermal shock result. Moreover, these unique results have been achieved merely upon use of particular compoistions and, thus, the procedures and skills presently available in the art can be used to practice this invention. All percentages in this specification are by weight unless otherwise specified or apparent.

In accordance with the provisions of the patent statutes, I have explained the principle of my invention and have described what I now consider to represent its best embodiment. However, it should be understood that, within the scope of the following claims, the invention can be practiced otherwise than as specifically described.

I claim:

1. A ceramic cement for joining ceramic substrates having a low coefficient of thermal expansion consisting essentially, by weight, of about 1 to 16 percent of lead oxide, about 1 to 15 percent of a flux other than lead oxide, at least one member seletced from the group consisting of about 1 to 6 percent of silicon carbide and about 1 to 6 percent of sulfur trioxide and the remainder substantially all lithium aluminosilicate ceramic material.

2. A cement in accordance with claim 1 in which the ceramic material is glass petalite.

3. A ceramic cement for joining ceramic substrates having a low coefficient of thermal expansion consisting essentially, by weight, of about 1 to 16 percent of lead oxide, about 1 to 6 percent of silicon carbide, about 1 to 6 percent of $SO_3$, about 1 to 15 percent of at least one flux selected from the group consisting of the fluorides of magnesium, calcium, strontium, barium, zinc, cadmium, lead, lithium, sodium, and potassium, and the remainder substantially all lithium aluminosilicate ceramic material which comprises at least 70 percent of the cement composition.

4. A ceramic cement for joining ceramic substrates having a low coefficient of thermal expansion consisting essentially, by weight, of about 1 to 16 percent of lead oxide, about 1 to 6 percent of silicon carbide, about 1 to 6 percent of $SO_3$, about 0.5 to 10 percent of one flux selected from the group consisting of the fluorides of magnesium, calcium, strontium, barium, zinc, cadmium, lead, lithium, sodium, and potassium, and about 0.5 to 10 percent of at least one other flux selected from the group consisting of the oxides and fluorides of magnesium, calcium, strontium barium, zinc, cadmium, lithium, sodium, and potassium, the total of all said fluxes being not greater than 15 percent, and the remainder substantially all lithium aluminosilicate ceramic material which comprises at least 70 percent of the cement composition.

5. A foamable ceramic cement for joining ceramic substrates having a low coefficient of thermal expansion consisting essentially, by weight, of 4 to 10 percent of lead oxide, 2 to 4 percent of silicon carbide, 2 to 4 percent of $SO_3$, to 1 to 3.5 percent of calcium fluoride, 1 to 10 percent of zinc oxide, up to 6 percent of zinc fluoride, up to 3 percent of magnesium oxide, up to 6 percent of magnesium fluoride, the total of said calcium fluoride, zinc oxide, zinc fluoride, magnesium oxide and magnesium fluoride being in the range of 8 to 13 percent, and the remainder glass petalite.

6. A method of structurally joining ceramic articles having a low coefficient of thermal expansion comprising placing said ceramic articles in position relative to one another to define a line of joinder, pouring into said line of joinder a foamable cement having a composition consisting essentially, by weight, of about 1 to 16 percent of lead oxide, about to 15 percent of a flux other than lead oxide, about 1 to 6 percent of silicon carbide, about 1 to 6 percent of sulfur trioxide and the remainder substantially all lithium aluminosilicate ceramic material, heating said ceramic structures with said cement in place to a temperature within the range of about 1050° to 1150° C. to foam said cement and fill said line of joinder, thereafter cooling said joined articles to handling temperature.

7. A ceramic structure comprising two ceramic substrates having a low coefficient of thermal expansion joined by a foamed ceramic cement having a batch composition consisting essentially, by weight, of 1 to 16 percent of lead oxide, about 1 to 15 percent of a flux other than lead oxide, about 1 to 6 percent of silicon carbide, about 1 to 6 percent of sulfur trioxide and the remainder substantially all lithium aluminosilicate ceramic material.

8. A method of structurally joining ceramic articles having a low coefficient of thermal expansion comprising placing said ceramic articles in position relative to one another to define a line of joinder, pouring in said line of joinder a foamable cement having a composition consisting essentially, by weight, of about 1 to 16 percent of lead oxide, about 1 to 6 percent of silicon carbide, about 1 to 6 percent of sulfur trioxide, about 1 to 15 percent of at least one flux selected from the group consisting of the fluorides of magnesium, calcium, strontium, barium, zinc, cadmium, lead, lithium, sodium, and potassium and the remainder substantially all lithium aluminosilicate ceramic material, heating said ceramic structures with the cement in place to a temperature within the range of about 1050° to 1150° C. to foam said cement and fill said line of joinder, and thereafter cooling the resulting joined articles.

9. A method of structurally joining ceramic articles of low coefficient of thermal expansion comprising placing said ceramic articles in position relative to one another to define a line of joinder, pouring into said line of joinder a foamable cement having a composition consisting essentially, by weight, of about 1 to 16 percent of lead oxide, about 1 to 6 percent of silicon carbide, about 1 to 6 percent of sulfur trioxide, about 0.5 to 10 percent of at least one flux selected from the group consisting of the fluorides of magnesium, calcium, strontium, barium, zinc, cadmium, lead, lithium, sodium, and potassium, about 0.5 to 10 percent of at least one other flux selected from the group consisting of the oxides and fluorides of magnesium, calcium, strontium, barium, zinc, cadmium, lithium, sodium, and potassium, the total of all said fluxes being not greater than 15 percent, and the remainder substantially all lithium aluminosilicate ceramic material, heating the ceramic structures with the cement in place to a temperature within the range of about 1050° to 1150° C. to foam the cement and fill the line of joinder, and thereafter cooling the joined articles to handling temperature.

10. A ceramic structure comprising two ceramic substrates having a low coefficient of thermal expansion joined by a foamed ceramic cement having a batch composition consisting essentially, by weight, of about 1 to 16 percent of lead oxide, about 1 to 6 percent of silicon carbide, about 1 to 6 percent of sulfur trioxide, about 1 to 15 percent of at least one flux selected from the group consisting of the fluorides of magnesium, calcium, strontium, barium, zinc, cadmium, lead, lithium, sodium, and potassium, and the remainder substantially all lithium aluminosilicate ceramic material.

11. A ceramic structure comprising two ceramic substrates having a low coefficient of thermal expansion joined by a foam ceramic cement having a batch composition consisting essentially, by weight, of about 1 to 16 percent of lead oxide, about 1 to 6 percent of silicon carbide, about 1 to 6 percent of sulfur trioxide, about 0.5 to 10 percent of at least one flux selected from the group consisting of the fluorides of magnesium, calcium, strontium, barium, zinc, cadmium, lead, lithium, sodium, and potassium, about 0.5 to 10 percent of at least one other flux selected from the group consisting of the oxides and fluorides of magnesium, calcium, strontium, barium, zinc, cadmium, lithium, sodium, and potassium, the total of all said fluxes being not greater than 15 percent, and the remainder substantially all lithium aluminosilicate ceramic material.

References Cited by the Examiner

UNITED STATES PATENTS

| | | | |
|---|---|---|---|
| Re. 23,106 | 5/49 | Gulick | 156—89 |
| 1,275,354 | 8/18 | Allen | 106—40 |
| 1,748,587 | 2/30 | Smedley | 65—22 |
| 2,106,578 | 1/38 | Schwartzwalder | 156—89 |
| 2,145,351 | 1/39 | Hazelton | 65—36 |
| 2,268,251 | 12/41 | Haux | 65—22 |
| 2,568,881 | 9/51 | Albers-Schoenberg | 154—43 |
| 2,600,525 | 6/52 | Ford | 106—40 |
| 2,611,712 | 9/52 | Ford | 106—40 |
| 2,706,844 | 4/55 | Nicholson | 106—40 |
| 2,843,507 | 7/58 | Long | 106—48 |
| 2,890,127 | 6/59 | Ford | 106—40 |
| 2,920,971 | 1/60 | Stookey | 106—39 |
| 3,040,213 | 6/62 | Byer et al. | 65—36 |

FOREIGN PATENTS 211,879   8/24   Great Britain.

TOBIAS E. LEVOW, *Primary Examiner.*

UNITED STATES PATENT OFFICE
CERTIFICATE OF CORRECTION

Patent No. 3,189,512                    June 15, 1965

Guy E. Stong

It is hereby certified that error appears in the above numbered patent requiring correction and that the said Letters Patent should read as corrected below.

Column 3, line 7, for "plate" read -- place --; column 4, line 54, for "gass" read -- gas --; column 5, line 37, for "compoistion" read -- composition --; line 56, for "compoistion read -- compositions --; line 72, for "seletced" read -- selected --; column 6, lines 23 and 24, after "strontium" insert a comma; line 33, strike out "to", first occurrence; same column 6, line 46, after "about" insert -- 1 --.

Signed and sealed this 21st day of December 1965.

(SEAL)
Attest:

ERNEST W. SWIDER                    EDWARD J. BRENNER
Attesting Officer                     Commissioner of Patents